United States Patent [19]

Simonet et al.

[11] 3,866,428

[45] Feb. 18, 1975

[54] CRYOGENIC SEPARATION OF AN AIR FEED USING MULTI-ZONE ADSORPTION UNITS

[75] Inventors: Guy Simonet; Claude Pivard, both of Paris, France

[73] Assignee: L'Air Liquide, Societe Anonyme Pour L'Etude Et L'Exploitation Des Procedes Georges Claude, Paris, France

[22] Filed: Apr. 28, 1972

[21] Appl. No.: 248,579

[30] Foreign Application Priority Data

May 3, 1971 France .............................. 71.15807

[52] U.S. Cl............................... 62/18, 62/17, 55/75
[51] Int. Cl.............................................. F25j 3/00
[58] Field of Search.......... 62/18, 13, 14, 15; 55/75

[56] References Cited
UNITED STATES PATENTS

| | | | |
|---|---|---|---|
| 3,140,931 | 7/1964 | McRobbie | 55/75 |
| 3,221,477 | 12/1965 | Arnoldi | 55/75 |
| 3,242,651 | 3/1966 | Arnoldi | 55/75 |
| 3,282,062 | 11/1966 | Hudson | 62/18 |
| 3,313,091 | 4/1967 | Berlin | 55/75 |
| 3,355,859 | 12/1967 | Karwat | 62/18 |
| 3,636,679 | 1/1972 | Batta | 55/75 |
| 3,719,025 | 3/1973 | Heinze | 55/75 |

Primary Examiner—A. Louis Monacell
Assistant Examiner—Frank Sever
Attorney, Agent, or Firm—Young & Thompson

[57] ABSTRACT

The invention relates to a method of fractionation of a gaseous mixture in order to obtain a gaseous fraction partly freed from at least one first constituent and one second constituent of said mixture, by means of at least one adsorption cycle comprising an adsorption phase during which said gaseous mixture circulates successively in at least one first adsorption zone and one second adsorption zone, adsorbing respectively said first and second constituents in order to obtain said gaseous fraction, and a desorption phase during which said first and second constituents are desorbed and a regeneration fraction circulates successively in said second and first adsorption zones, said gaseous mixture being cooled during the adsorption phase in a thermal accumulation zone, by extracting from said mixture at least the quantity of heat liberated by the adsorption of said first constituent, and then restoring to said mixture at least the quantity of cold liberated by the desorption of said second constituent during a previous cycle, said regeneration fraction being heated in said zone by extracting from said fraction at least the quantity of cold liberated by the desorption of said second constituent, and then restoring to said fraction at least the quantity of heat extracted.

10 Claims, 8 Drawing Figures

3,866,428

CRYOGENIC SEPARATION OF AN AIR FEED USING MULTI-ZONE ADSORPTION UNITS

The present invention relates generally to the fractionation of a gaseous mixture by adsorption, in order to produce a gaseous fraction which is at least partly free from at least one first constituent and one second constituent of the said mixture. In particular, the invention is concerned with the fractionation of atmospheric air by adsorption, in order to obtain a fraction rich in oxygen and therefore a gaseous fraction at least partly free from at least the humidity and the nitrogen of the treated air.

It is known that the production of oxygen of average purity (contents of oxygen at most equal to 96 percent) or of air enriched in oxygen, may be effected by various methods. The liquefaction of air followed by its distillation lead readily to the production of very pure oxygen which can then be diluted with air according to the oxygen content desired, or to the direct production of air enriched in oxygen. For small production units however, such methods necessarily involve large investment costs and thus result in a relatively-high production cost of the oxygen produced.

In the case of small production units, it has proved preferable to adopt adsorption processes which permit the production at a lower cost of oxygen having a purity at most equal to 96 percent. To this end, a cyclic method of adsorption has been proposed which comprises:

a. An adsorption phase during which the atmospheric air (and therefore air containing humidity and carbon dioxide) is caused to circulate successively in a first adsorption zone, or a dessication-decarbonation zone, which preferably adsorbs essentially the humidity but also the carbon dioxide in the atmospheric air treated, and then in a second adsorption zone or oxygen-nitrogen separation zone, which preferentially adsorbs the nitrogen from the dry and decarbonated air coming from the first adsorption zone. At the outlet of this adsorption phase there is thus obtained a gaseous fraction enriched in oxygen and dry, and thus a fraction substantially freed from humidity, carbon dioxide and nitrogen in the atmospheric air treated.

b. A desorption phase, in which are desorbed the carbon dioxide and the humidity adsorbed in the first adsorption zone, the nitrogen adsorbed in the second adsorption zone is desorbed, and there is obtained a regeneration fraction enriched in nitrogen and moist, previously circulating in counter-flow to the atmospheric air during the adsorption phase, successively in the second adsorption zone and in the first adsorption zone. This desorption phase is generally carried out at a desorption pressure lower than atmospheric pressure, forming a vacuum at the inlet of the first adsorption zone, according to the direction of adsorption.

This method however results in appreciable drawbacks, which are very marked when the adsorption phase is effected at an adsorption pressure in the vicinity of atmospheric pressure. In fact, when the adsorption pressure is in the neighbourhood of atmospheric pressure, the air to be treated carries a large quantity of water as compared with the case where the adsorption is effected at a pressure greater than atmospheric pressure, and in which a large part of this water has been stopped during the compression of the treated air.

In the method previously described, the quantity of heat liberated during the adsorption phase by the adsorption of water and carbon dioxide in the first zone, is carried away, at least partly, by the gaseous mixture, from this latter towards the second adsorption zone.

The result is that this heat assists in the at least partial heating of the second adsorption zone and therefore interferes with the adsorption of the nitrogen in the said zone, thereby reducing the adsorption capacity of the said zone. Conversely, the quantity of cold liberated during the desorption phase by the desorption of the nitrogen in the second zone, is carried away by the regeneration fraction from this latter zone towards the first adsorption zone. The result is that this cold assists at least partially in the cooling of the first adsorption zone, and thus interferes with the desorption of the water and the carbon dioxide in the said zone, thereby reducing the desorption capacity of the said zone.

In consequence, after the completion of a certain number of adsorption cycles, the first adsorption zone becomes saturated with water and carbon dioxide, and also the adsorption capacity of the second adsorption zone becomes limited. In fact, in the case of the method previously described, at the end of a certain period, the first adsorption zone is regenerated in a first stage, during which the said zone is heated and is swept out with air, and in a second stage during which the said zone is cooled.

These disadvantages have thus the effect of complicating the corresponding adsorption installation, on the one hand by making necessary two first adsorption zones changed over periodically for each second adsorption zone, and on the other hand, by providing heating means and cooling means for each first adsorption zone.

In consequence, the method of adsorption above-described cannot be utilized without a supplementary provision of external heat and cold, and cannot therefore be thermally autonomous.

The present invention thus proposes to remedy these various drawbacks. In particular, the invention proposes to render the above-described method of adsorption independent of any external frigorific or calorific source and thus to make it thermally autonomous.

Another object of the invention is a method of adsorption especially applicable to the fractionation of atmospheric air, very simple in its utilization and not necessitating any heating and cooling means.

According to the invention, during the adsorption phase, the gaseous mixture is cooled in a thermal accumulation zone separating the first and second adsorption zone, by extracting from the said mixture during its passage in the said accumulation zone, at least the quantity of heat liberated by the adsorption of the first constituent, and then restoring to the said mixture, during its passage in the said zone, at least the quantity of cold liberated by the desorption of the second constituent during the preceding cycle; and during the desorption phase, the regeneration fraction in the said zone is heated by extracting from the said fraction, during its passage in the said zone, at least the quantity of cold liberated by the desorption of the second constituent, then restoring to the said fraction, during its passage in the said zone, at least the said quantity of heat.

In consequence, according to the invention, during successive adsorption cycles, the adsorption heat liberated by the adsorption of the first constituent in the first adsorption zone, carried away with the gaseous mixture during the adsorption phase, is stopped in the intermediate thermal accumulation zone and temporarily accumulated in this latter. Then, during the following desorption phase, this heat is released from the accumulation zone, carried back in the opposite direction to the adsorption, with the regeneration fraction into the first adsorption zone, in which it helps to compensate the desorption cold liberated by the desorption of the first constituent in the first adsorption zone.

In the same way, during successive adsorption cycles, the desorption cold liberated by the desorption of the second constituent in the second adsorption zone, conveyed by the regeneration fraction during the desorption phase, is stopped in the intermediate thermal accumulation zone and temporarily accumulated in this latter. Then, during the following adsorption phase, this cold is released from the accumulation zone, led back in the opposite direction to the desorption, with the gaseous mixture into the second adsorption zone, in which it helps to compensate the adsorption heat liberated by the adsorption of the second constituent in the second adsorption zone.

It results from the above thermal considerations (modified by the thermal imperfections of the adsorption system utilized) that during the adsorption phase, the heat liberated in the first adsorption zone does not pass into the second adsorption zone, and does not in any way interfere with the adsorption taking place there, and that during the desorption phase, the cold liberated in the second adsorption zone does not pass into the first adsorption zone, and does not in any way interfere with the desorption which takes place there.

In consequence, the thermal accumulation zone plays to some extent the part of a "thermal buffer" between the two adsorption zones, and prevents these latter interfering with each other during their operation.

In conclusion, according to the invention, as the adsorption zones themselves generate, independently of each other, the cold or the heat which they require in order to work in desorption or adsorption, it becomes possible to carry out the adsorption and desorption phases simultaneously in a substantially adiabatic manner, especially in the vicinity of ambient temperature, and therefore without supplementary external supply of heat or cold. This is very important for the corresponding adsorption installation, which then requires only low investment costs and is fundamental in the case of methods of fractionation of air by adsorption in order to produce oxygen or enriched air.

On the other hand, when the adsorption pressure is higher than the desorption pressure, in the desorption phase results in the production of cold by expansion of the gas contained in the adsorption zones. In this case, this additional quantity of cold is so-to-speak trapped in the thermal accumulation zone and does not interfere in any way with the desorption of the constituents of the gaseous mixture treated.

The same conditions apply in a converse manner, for an adsorption pressure higher than the desorption pressure, when, before the adsorption phase, the pressure is increased from the said desorption pressure to the adsorption pressure. The additional quantity of heat produced by compression is to some extent trapped in the thermal accumulation zone and does not in any way interfere with the adsorption of the constituents of the gaseous mixture treated.

The present invention will now be described with reference to the accompanying drawings, in which.

Figure 1:
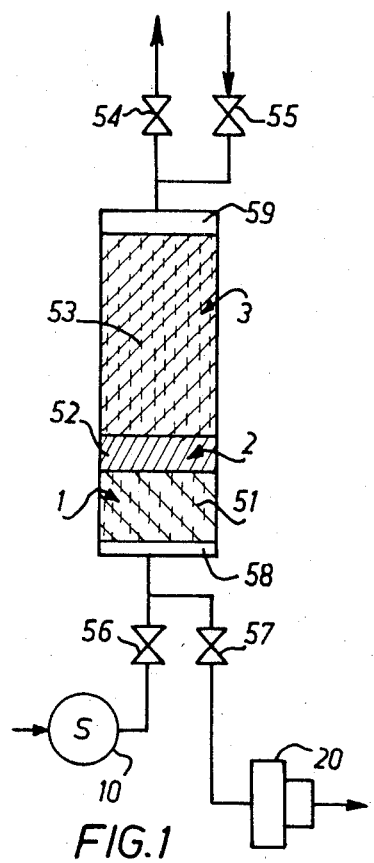
FIG. 1 shows an installation according to the invention, utilized for the fractionation of atmospheric air, comprising a single adsorption line.
Figure 6:
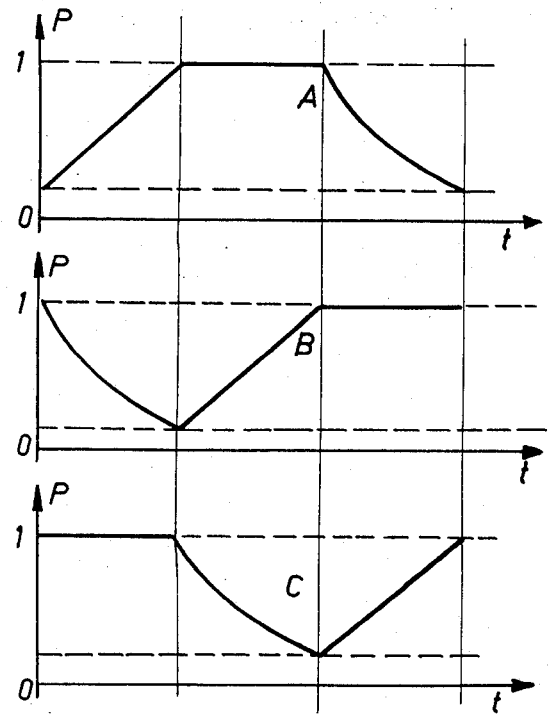
Figure 4:
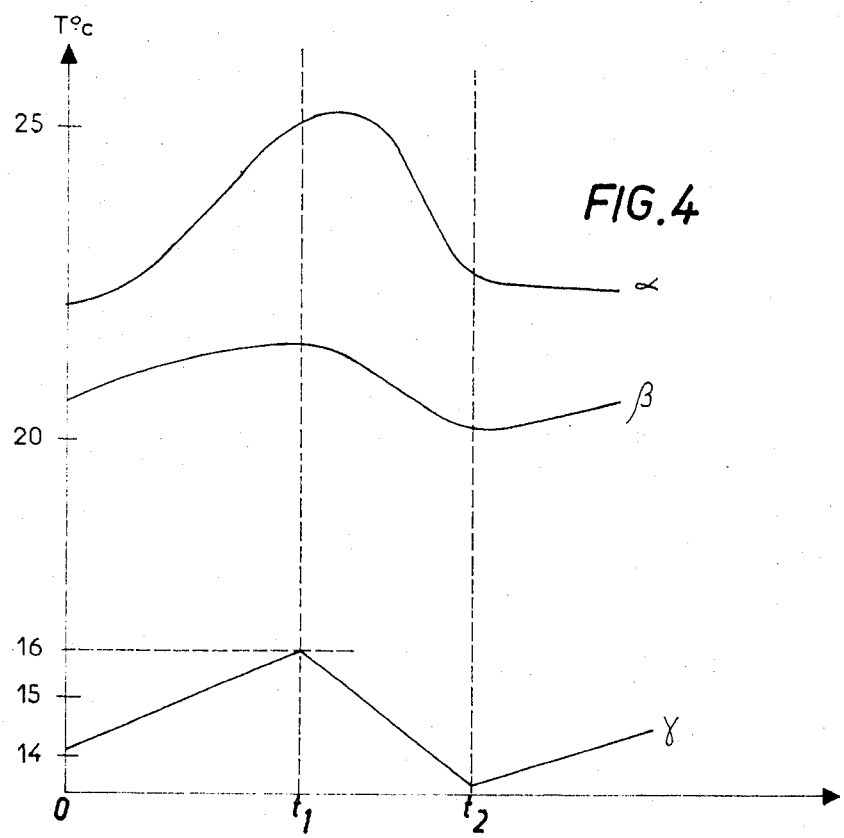
Figure 3:
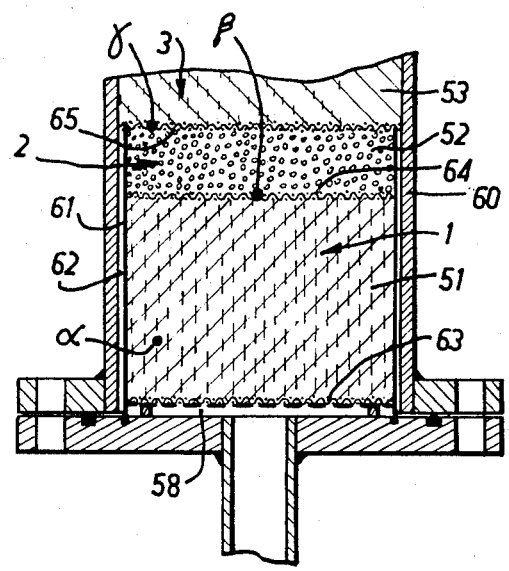
FIG. 3 shows a view in axial cross-section of the lower part of an adsorber according to the invention.
Figure 5:
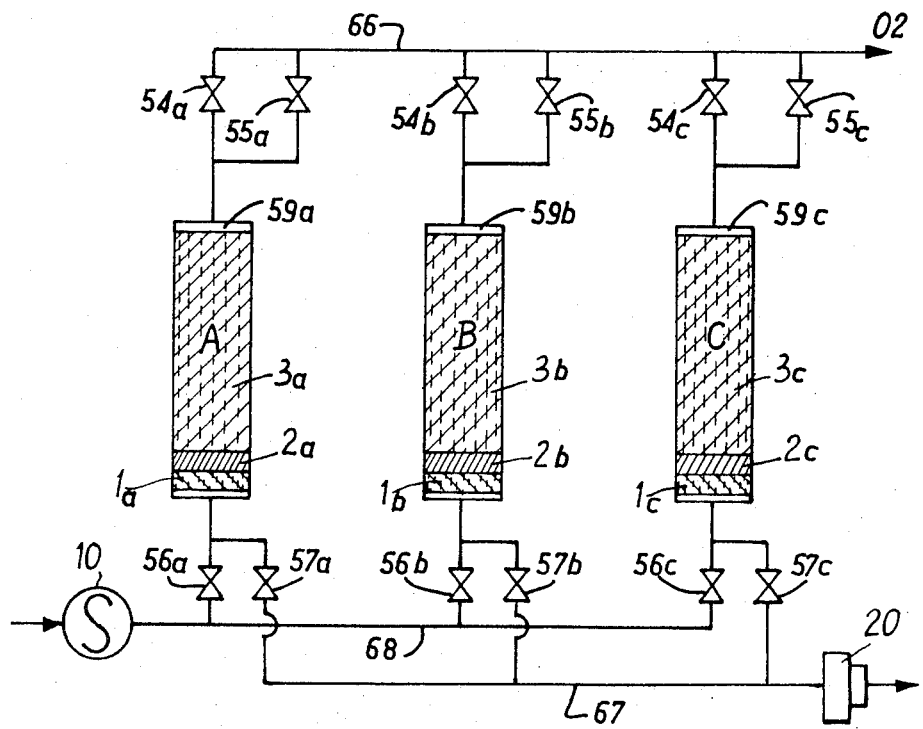
Figure 8:
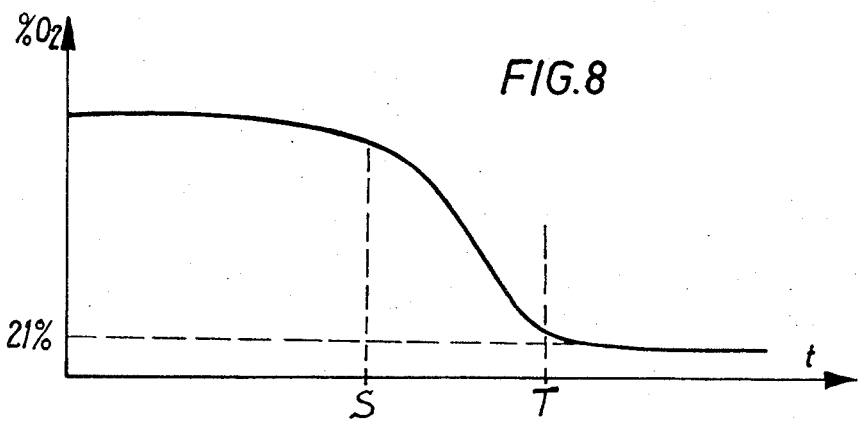
Figure 7:
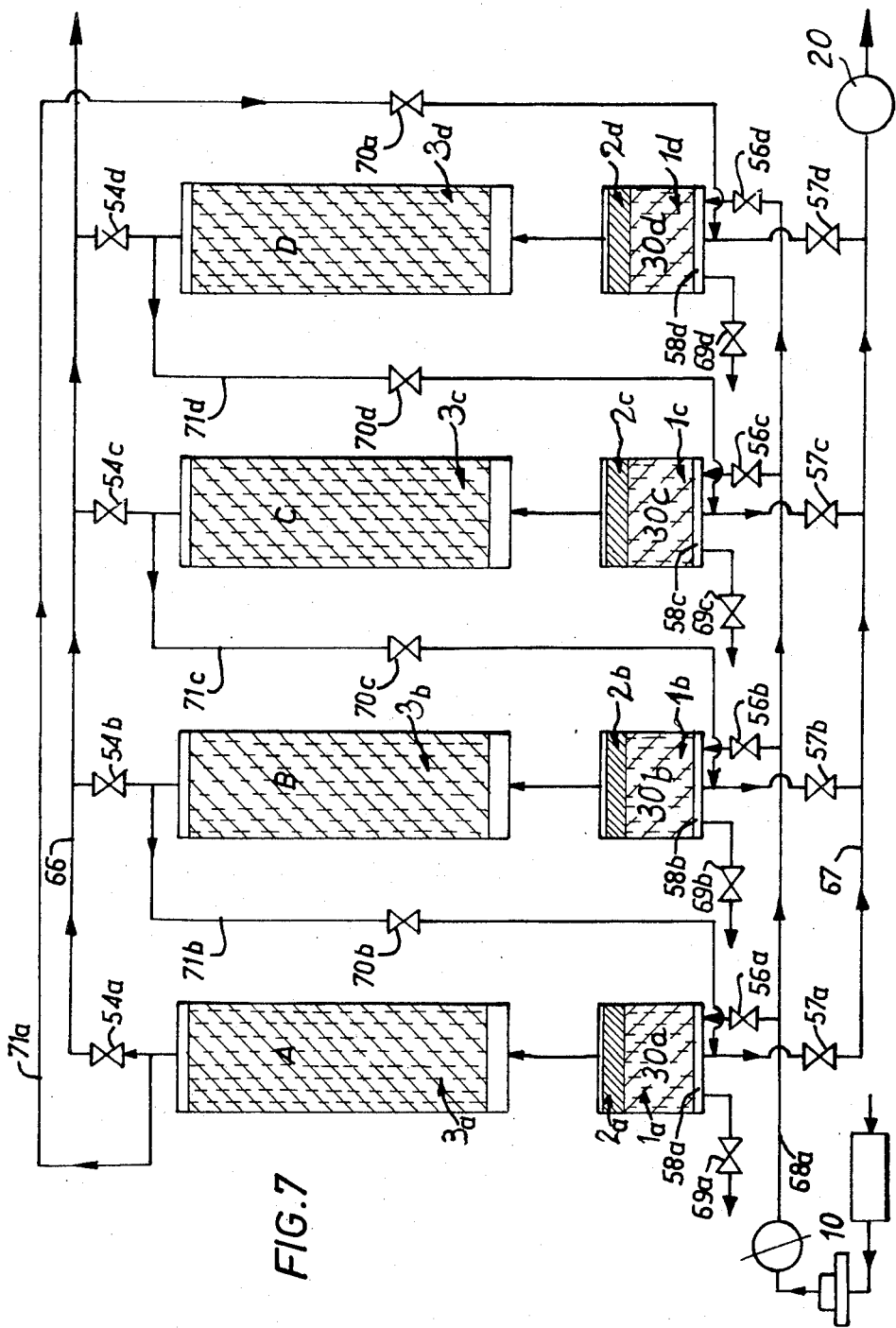

FIG. 4 illustrates the evolution of the temperatures T (expressed in °C.) of the thermo-couples $\alpha$, $\beta$, $\gamma$, arranged in accordance with FIG. 3, in an adsorber according to the invention, as a function of the time during an adsorption cycle. The adsorption phase is comprised between the times $o$ and $t$, the desorption phase is comprised between $t1$ and $t2$, the pressure-increase phase begins at $t2$;

FIG. 5 shows an air-fractionating installation comprising three adsorption lines similar to that shown in FIG. 1;

FIG. 6 represents an operation diagram of the installation shown in FIG. 5;

FIG. 7 shows a fractionating installation comprising four adsorption lines similar to that shown in FIG. 1;

FIG. 8 represents the evolution of the oxygen content of the fraction enriched in oxygen delivered from an adsorption line according to FIG. 1, as a function of the time.

The installation for fractionation of atmospheric air shown in FIG. 1, comprises a single adsorption line. This latter comprises, from the bottom upwards, a first adsorption zone 1 or dessication and decarbonation zone, comprising a first adsorption bed 51 (of activated alumina or silica gel for example); a thermal accumulation zone 2 comprising a heat accumulation mass 52 constituted by lead shot or copper cuttings, or any other metallic mass permeable to any flow of gas and having a large thermal capacity; a second adsorption zone 3 or oxygen-nitrogen separation zone, comprising a second adsorption bed 53 (of the 5A molecular sieve type for example).

The adsorption zones 1 and 3 thus communicate with each other through the intermediary of the thermal accumulation zone 2. The first adsorption bed 51 and the second adsorption bed 53, separated by the thermal accumulation mass 52 are arranged in a single adsorber. The inlet 58 of the adsorber and therefore of the first adsorption zone 1, communicates with an air circulator 10 and a vacuum pump 20, respectively through the intermediary of the valves 56 and 57. The outlet 59 of the adsorber and therefore of the second adsorption zone 3, communicates with a storage of oxygen (not shown) and with a source of a gas free from humidity and nitrogen (not shown), respectively through the valves 54 and 55.

An elementary adsorption cycle employed with the adsorption line shown in FIG. 1 comprises successively an adsorption phase, a desorption phase, a pressure-increase phase, having substantially equal durations.

During the adsorption phase, the valves 55 and 57 are closed and the valves 54 and 56 are open. Atmospheric air charged with humidity and carbon dioxide (gaseous mixture) is sent by the circulator 10 at an adsorption pressure in the neighbourhood of atmospheric pressure towards the inlet 58 of the first adsorption zone 1. It then circulates under the adsorption pressure, in a rising adsorption direction, successively in the first adsorption zone 1, the thermal accumulation zone 2, the second adsorption zone 3.

In the first adsorption zone 1, the humidity of the atmospheric air (first constituent of the gaseous mixture) and its carbon dioxide are preferentially adsorbed, liberating a certain quantity of heat. In the thermal accumulation zone 2, the dehydrated and decarbonated air coming from the adsorption zone 1 is cooled. For that purpose, in the lower portion of the accumulation zone, there is extracted from the dry, decarbonated air, at least the quantity of heat liberated by the adsorption of the water, then in the upper part of the accumulation zone, there is restored to the dry and decarbonated air at least the quantity of cold liberated by the desorption of the nitrogen (second constituent) and accumulated in the thermal accumulated zone during the desorption phase of the previous cycle.

In the third adsorption zone 3, there is preferentially adsorbed the nitrogen of the dry decarbonated and cooled air. Finally, there is extracted at the outlet 59 of the third adsorption zone, a gaseous fraction enriched in oxygen and dry, and therefore practically free from the moisture and the nitrogen of the initial air.

During the desorption phase, the valves 54 and 56 are closed and the valve 57 is opened. This phase of desorption is effected under a desorption pressure lower than atmospheric pressure, evacuating the adsorption zones 1 and 3 and the thermal accumulation zone 2 at the same time by the application of a vacuum to the inlet 58 of the first adsorption zone 1.

The nitrogen adsorbed in the second zone 3 and the humidity and carbon dioxide adsorbed in the first zone 1 are then desorbed and there is obtained a regeneration fraction produced in the second adsorption zone 3, circulating downwards in the opposite direction to the adsorption, successively in the second zone 3, the thermal accumulation zone 2 and the first zone 1. In the third adsorption zone 3, the regeneration fraction is produced by desorption of the nitrogen, and a certain quantity of cold is correlatively liberated.

In the thermal accumulation zone 2, the regeneration fraction (essentially nitrogen) coming from the adsorption zone 3 is heated. For that purpose, in the upper portion of the accumulation zone 2 there is extracted from the nitrogen at least the quantity of cold liberated by the desorption of the nitrogen, then in the lower portion of the accumulation zone 2 there is restored to the nitrogen at least the quantity of heat liberated by the adsorption of humidity and accumulated in the thermal accumulation zone during the previous adsorption phase.

In the first adsorption zone 1, the cooled nitrogen sweeps out this latter and becomes charged with humidity and carbon dioxide which have been desorbed in the said zone. Finally, from the inlet 58 of the first adsorption zone, there is extracted the regeneration fraction enriched with nitrogen charged with humidity. This fraction is evacuated by the vacuum pump 20.

During the phase of increase in pressure, the valve 57 is closed and the valve 55 is open. During this phase, the pressure of the adsorption zones 1 and 3 and of the thermal accumulation zone 2 is increased from the desorption pressure obtained at the end of the desorption phase to the adsorption pressure in the vicinity of atmospheric pressure. For this purpose, dry oxygen (the gas free from humidity and nitrogen) is introduced into the zones 1, 2 and 3 in the opposite direction to that of adsorption, from the outlet 59 of the second adsorption zone 3. The oxygen introduced is preferably obtained from a reserve fed by oxygen produced during the adsorption phase.

Figure 2:
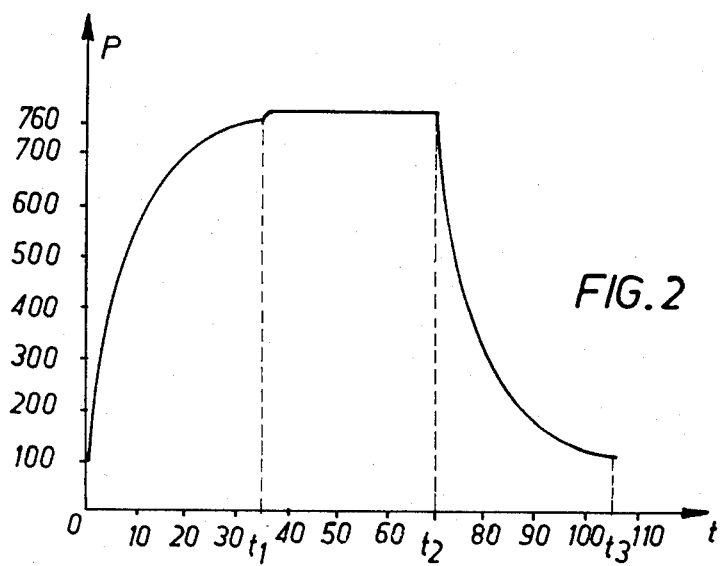
FIG. 2 shows the variations of the pressure P, expressed in millimetres of mercury, as a function of the time expressed in seconds, during an adsorption cycle utilized with the installation in accordance with FIG. 1.

The adsorption cycle previously described is illustrated for example by the diagram of pressures shown in FIG. 2. The pressure-increase, adsorption and desorption phases are respectively comprised between the times 0 and $t1$, $t1$ and $t2$, $t2$ and $t3$.

In order to prevent any dissipation of heat towards the exterior of the adsorption zones 1 and 3 and of the thermal accumulation zone 2, the adsorption beds 51 and 53 and the thermal accumulation mass 52 are arranged in a single adsorber and may be thermally isolated from the exterior of this latter.

In particular, in accordance with FIG. 3, the bed 51 and the mass 52 are arranged inside a shell 61 of stainless steel of small thickness (0.4 mm. for example), forming with the wall 60 of the adsorber a thermal isolation space 62. The heat losses of the dessication bed 51 comprised between the metal lattices 63 and 64, and of the accumulation mass 52 comprised between the metal lattices 64 and 65, are thus reduced to an absolute minimum. According to FIG. 3, it then becomes possible in accordance with the invention to carry out the adsorption and desorption phases in a quasi-adiabatic manner.

Tests carried out on a column of 200 mm. in diameter containing a bed 51 of alumina of 150 mm. in height, a mass 52 of thermal accumulation constituted by a bed of lead shot (2 mm. in diameter) of 45 mm. in height have clearly shown the advantage of the method according to the invention in determining the temperature at the points $\alpha$, $\beta$, and $\gamma$ of the adsorber.

If the speed of passage of the atmospheric air during the adsorption phase at atmospheric pressure is comprised between 10 and 30 cm. per second, for example 20 cm. per second, the evolution of the temperature as a function of the time is determined (Cf FIG. 4) by means of thermo-couples $\alpha$, $\beta$, and $\gamma$, placed respectively at the inlet 58 of the alumina bed 51 between the bed 51 and the mass 52, between the mass 52 and the bed 53 (see FIG. 3).

It is found that, by virtue of the thermal accumulation zone 2 interposed between the adsorption zones 1 and 3, the temperature of the regeneration fraction during its passage through the zone 2 (during the desorption phase) varies on the average from 15° to 21°C. approx., and is therefore heated before passing into the dessication zone 1. This difference in temperature of about 6°C. enables the efficiency of the desorption effected in the zone 1 during the desorption phase to be considerably increased, and therefore correspondingly improves the dessication during the adsorption phase.

In addition, as the dessication bed is better regenerated by virtue of the accumulation zone 2, it is possible to carry out the adsorption phase at a pressure lower than the pressures generally employed, and in particular, as indicated above, at pressures in the vicinity of atmospheric pressure.

Conversely, by virtue of the thermal accumulation zone, the temperature of the air treated during the adsorption phase passes on the average from about 21° to 15°C. during its passage into the accumulation zone 2, and is thus cooled before passing into the oxygen-nitrogen separation zone. This difference in temperature makes it possible to increase considerably the efficiency of the oxygen-nitrogen separation carried out in the zone 3 during the adsorption phase.

It also results from FIG. 4 that, during the adsorption phase, the air treated is pre-cooled in the dessication bed and that, during the desorption phase, the regeneration nitrogen ends by being heated in the dessication bed. This shows that, according to the relative dimensions of the adsorption beds 51 and 53 and the accumulation mass 52, the accumulation zone 2 is capable of being extended beyond the mass 52 and of penetrating, at least partially, into the dessication bed 51 and/or into the oxygen-nitrogen separation bed 53.

In order to be able to treat atmospheric air continuously and to produce continuously a fraction enriched in oxygen, the installation shown in FIG. 5 comprises three adsorption lines A, B, C, similar to those of FIG. 1 and connected in parallel with each other. The valves 54 and 55 of the three adsorption lines communicate with an oxygen-collecting conduit 66. The valves 56 communicate with an air-distribution conduit 68 and the valves 57 communicate with an evacuation conduit 67.

Each line A, B or C works in accordance with an adsorption cycle identical with that described in the case of FIG. 1, in which the adsorption, desorption and pressure-increase phases have substantially equal duration. In consequence, the lines A, B and C are changed over periodically with a permutation following the diagram of operation shown in FIG. 6.

During the operation of the adsorption lines A, B and C, the pressure-increase phase of a given line is carried out in accordance with the method previously described, by introducing into the said line a part of the fraction enriched in oxygen produced in a neighbouring adsorption line.

For this purpose for example, simultaneously during the pressure-increase phase of the line A and during the adsorption phase of the adjacent line B, the valves 56a, 57a, 54a, 57b, 55b being closed, and the valves 55a and 54b being open, a part of the fraction enriched in oxygen produced by the line B is diverted from the outlet 59b of the second adsorption zone 3b towards the outlet 59a of the second adsorption zone 3a.

By way of example, there will be found in the following Table the values of the operation parameters of an installation according to FIG. 5, operating in accordance with FIG. 6, permitting the production of 6 tonnes per day of oxygen with a purity of 90 percent, the adsorption cycle employed comprising three phases of adsorption, desorption and pressure increase having equal durations of 40 seconds. These values are expressed for three different values (70, 100 and 125 mm. of mercury respectively) of the final desorption pressure reached at the outlet of the desorption phase.

| Final desorption pressure in mm.Hg | 70 | 100 | 125 |
|---|---|---|---|
| Extraction efficiency of oxygen | 0.45 | 0.41 | 0.36 |
| Flow-rate of atmospheric air in cu.m./hr | 1985.7 | 2179 | 2482 |
| Flow-rate of nitrogen delivered by the vacuum pump, in cu.m/hr | 1777.2 | 1970.9 | 2273.6 |
| Mass of the N₂/O₂ adsorption bed per adsorption line, in kg | 2407.5 | 2883.5 | 3537.0 |
| Suction capacity of vacuum pump in cu.m/hr (efficiency equal to 80%) | 6957 | 6545 | 6804 |

The above Table illustrates the effect of the final desorption pressure on the suction capacity of the vacuum pump. It can be seen that the production of 6 tonnes of oxygen per day with a final desorption vacuum of 70 mm. of mercury necessitates a vacuum pump having a greater output than when the final vacuum is 125 or 100 mm. of mercury. Between 125 and 100 mm. of mercury, the difference is small. Furthermore, it has been verified that a higher final desorption pressure (200 to 300 mm. of mercury) did not permit high contents of oxygen to be obtained, irrespective of the extraction efficiency. In consequence, the final desorption pressure is chosen between 50 and 150 mm. of mercury, and is preferably in the vicinity of 100 mm. of mercury.

Furthermore, it should be noted that the extraction efficiency is influenced by the duration of the elementary phases of adsorption, desorption and pressure-increase. No substantial variations have been observed when the duration of each phase is greater than 35 seconds. On the other hand, when the duration of the adsorption phase is 21 seconds and that of the desorption phase is 18 seconds, there was then observed a substantial drop in the extraction efficiency, which passes from about 40 percent to 30 percent. In consequence, the duration of a phase of an adsorption cycle is chosen between 20 and 60 seconds and preferably between 35 and 45 seconds.

By way of example, the dimensioning of an oxygen production unit working by adsorption may be as follows:

Production of 6 tonnes per day of oxygen at 90 percent purity;

Hourly production of oxygen at 90 percent: 208 cu.m./hr;

Final adsorption pressure: 100 mm. Hg;

Three phases of adsorption, desorption, pressure increase, of 40 seconds each;

Extraction efficiency: 44 percent;

Flow-rate of air treated: 2,030 cu.m./hr at 20°C.;

Flow-rate delivered by the vacuum pump: 1,821.5 cu.m./hr;

Total mass of molecular sieve per bed of $O_2/N_2$ separation in a given adsorption line: 2,452.2 kg., representing 3.781 cu.m.;

Suction capacity of the vacuum pump: 6,180 cu.m./hr for an average efficiency of 80 percent.

It is of course possible to operate with adsorption pressures higher than atmospheric pressure, for example of the order of two atmospheres. In this case, the method of fractionation by adsorption according to the invention can be carried into effect in a fractionating installation in accordance with FIG. 7, which permits the continuous production of a fraction enriched in oxygen from atmospheric air. The installation shown in FIG. 7 utilizes four adsorption lines: A, B, C and D connected in parallel with each other, working simultaneously on the same adsorption cycle and changed over periodically in a circular permutation.

In the case of FIG. 7, an adsorption cycle utilized in a given adsorption line comprises the same phases as those previously specified, but it further comprises an additional pressure-reduction phase, comprised between the adsorption phase and the desorption phase. During this pressure-reduction phase, the pressure of the two adsorption zones 1 and 3 and of the thermal accumulation zone 2 is reduced from the adsorption pressure to an intermediate pressure in the vicinity of atmospheric pressure.

The desorption phase is then begun for this intermediate pressure. The pressure-reduction phase is preferably effected by connecting to air, extracting in counter-flow to the adsorption direction from the inlet 58 of the first adsorption zone 1, by means of a valve 69, an intermediate fraction comprising at least part of the humidity and the nitrogen desorbed during the said pressure-reduction phase.

In order to permit the changing over of the adsorption lines A, B, C and D, the duration of the four phases of adsorption, pressure reduction, desorption, pressure increase, is substantially the same.

On the other hand, an adsorption cycle utilized on any one of the adsorption lines A, B, C, D of FIG. 7 further comprises the following particular feature. The adsorption phase comprises a first stage during which the fraction obtained enriched in oxygen is extracted through the conduit 66 as a product, until the said fraction has a pre-determined composition, and a second stage beginning for the said composition, during which the enriched fraction obtained is diverted through a conduit 71 as a sub-product, until the said fraction has a composition in the neighbourhood of that of the atmospheric air treated.

In fact, the oxygen content of the fraction enriched in oxygen (measured by an oxygen analyzer) obtained at the outlet 59 of a second adsorption zone 3 varies as a function of the time, as shown in FIG. 8. In particular, starting from the instant S, the oxygen content begins to decrease until it reaches, at the instant T, the initial content of the atmospheric air treated.

In consequence, if it is desired to obtain a particularly high and constant oxygen content for the enriched fraction produced, the first stage of the adsorption phase is carried out until the composition reaches that corresponding to the instant S, and the second stage is continued until the composition at the instant T reaches that of the atmospheric air treated.

Preferably, instead of putting to the air the fraction produced during the second stage of the adsorption phase in a given adsorption line, this latter is re-cycled to the input of an adjacent adsorption line. For that purpose, for example, during the second stage of the adsorption phase of the adsorption line A, and during the first stage of the adsorption phase of the adsorption line D, the gaseous fraction obtained at the outlet of the second adsorption zone 3a, still rich in oxygen, is diverted through a conduit 71a so as to be introduced through the open valve 70a (the valve 54a being closed) to the input 58d of the first adsorption zone 1d.

What we claim is:

1. A method of fractionation by adsorption of air in order to obtain a gaseous fraction impoverished in at least a first constituent and a second constituent of said air, carried out with at least one adsorption line comprising in the direction of the adsorption cycle stream successively a first adsorption zone, a thermal accumulation zone, and a second adsorption zone, said zones being fixedly connected in series and continuously in communication with each other, and said first and second adsorption zones adsorbing respectively at least said first constituent and at least said second constituent of said air, said method comprising performing at least an adsorption cycle with a single said adsorption line operating in a substantially adiabatic manner, said adsorption cycle comprising:

a. an adsorption and production phase during which said air enters the inlet of the adsorption line, flows in said adsorption line in the adsorption direction from said first adsorption zone, into successively said thermal accumulation zone and said second adsorption zone, and at least said impoverished gaseous fraction is obtained at the outlet of said adsorption line; during said phase, in said thermal accumulation zone there is extracted from said air a quantity of heat liberated by the adsorption of said first constituent in said first adsorption zone, and then there is restored to said air a quantity of refrigeration liberated by the desorption of said second constituent in said second adsorption zone, during a desorption and regeneration phase, hereunder defined as phase *b*, of a previous cycle carried out with said adsorption line, whereby said air is cooled between said first and second adsorption zones, b. a desorption and regeneration phase during which at least said first and second constituent are desorbed, and a regeneration fraction flows in said adsorption line up to the inlet thereof, countercurrent to the adsorption direction, from said second adsorption zone into said thermal accumulation zone and said first adsorption zone, and at least another gaseous fraction enriched in at least said first constituent and said second constituent, is obtained at the inlet of said adsorption line; during phase *b*, in said thermal accumulation zone there is extracted from said regeneration fraction a quantity of refrigeration liberated by the desorption of said second constituent in said second adsorption zone, and then there is restored to said regeneration fraction, the quantity of heat extracted during the previous adsorption and production phase of the same cycle, hereabove defined as phase *a*, whereby said regeneration fraction is heated between said second and first adsorption zones.

2. A method as claimed in claim 1, in which during said adsorption cycle, said another enriched gaseous fraction is obtained from the inlet of said adsorption line, during said desorption and regeneration phase, at a desorption pressure lower than the adsorption pressure at which said impoverished gaseous fraction is obtained from the outlet of said adsorption line, during said adsorption and production phase, and wherein said adsorption cycle comprises a further pressure-increase phase comprised between said adsorption and production phase and said desorption and regeneration phase, during which a pressure-increase gas impoverished in said first and second constituents is introduced into the outlet of the adsorption line, countercurrently to the adsorption direction, the inlet of said adsorption line being closed, whereby the pressure in said adsorption line is increased.

3. A method as claimed in claim 2, wherein said impoverished gaseous fraction is produced continuously by using a plurality of identical said adsorption lines operating simultaneously, each according to the same said adsorption cycle, and changed over periodically in cyclic permutation, and wherein simultaneously during the pressure-increase phase of a first adsorption line and during the adsorption and production phase of a second adsorption line, a part of the impoverished gaseous fraction obtained from the outlet of the second line is diverted toward the outlet of the first line, as said pressure-increase gas.

4. A method as claimed in claim 1, in which said adsorption and production phase of said adsorption cycle comprises a first step during which the impoverished gaseous fraction obtained from the outlet of said adsorption line is withdrawn as a product stream until said fraction has a predetermined composition, and a second step during which the gas obtained from the outlet of said adsorption line is diverted as a byproduct stream until said gas has a composition in the neighborhood of that of the starting gaseous mixture.

5. A method as claimed in claim 4, wherein said impoverished gaseous fraction is produced continuously by using a plurality of identical said adsorption lines operating simultaneously, each according to the same adsorption cycle, and changed over periodically in cyclic permutation, and wherein simultaneously during the second step of the adsorption and production phase of a first adsorption line, and during the first step of the adsorption and production phase of a second adsorption line, the gas diverted as a byproduct stream from the outlet of first line is sent toward the inlet of second line.

6. A method as claimed in claim 1, wherein said desorption and regeneration phase comprises a vacuum stage during which said another enriched gaseous fraction is sucked from the inlet of said adsorption line, the outlet thereof being closed, whereby the desorption pressure in said line is decreased, and wherein the final desorption pressure obtained at the end of said vacuum stage is comprised between 50 and 150 torr.

7. A method as claimed in claim 6, wherein said final desorption pressure is about 100 torr.

8. A method as claimed in claim 1, wherein the duration of the adsorption and production phase of said adsorption cycle is comprised between 20 and 60 seconds.

9. A method as claimed in claim 8, wherein said duration is between 35 and 45 seconds.

10. An installation for the fractionation by adsorption of air, comprising at least a confined adsorption line operating in a substantially adiabatic manner and enclosing a first adsorption bed and a second adsorption bed, a thermal accumulation mass interposed between said adsorption beds, means to feed air serially through said first bed and said mass and said second bed, and meaans to feed a gas serially through said second bed and said mass and said first bed.

* * * * *